(12) United States Patent
Littlefield

(10) Patent No.: US 9,743,068 B2
(45) Date of Patent: Aug. 22, 2017

(54) APPARATUS FOR GENERATION OF THREE-DIMENSIONAL DIGITAL DATA REPRESENTATIVE OF HEAD SHAPES

(71) Applicant: CRANIAL TECHNOLOGIES, INC., Tempe, AZ (US)

(72) Inventor: Timothy R Littlefield, Phoenix, AZ (US)

(73) Assignee: CRANIAL TECHNOLOGIES, INC., Tempe, AZ (US)

( * ) Notice: Subject to any disclaimer, the term of this patent is extended or adjusted under 35 U.S.C. 154(b) by 343 days.

(21) Appl. No.: 14/583,496

(22) Filed: Dec. 26, 2014

(65) Prior Publication Data

US 2016/0191900 A1    Jun. 30, 2016

(51) Int. Cl.
| | |
|---|---|
| *H04N 13/02* | (2006.01) |
| *H04N 5/225* | (2006.01) |
| *H04N 5/232* | (2006.01) |
| *G06T 17/00* | (2006.01) |
| *G06T 7/00* | (2017.01) |

(52) U.S. Cl.
CPC .......... *H04N 13/0242* (2013.01); *G06T 7/00* (2013.01); *G06T 17/00* (2013.01); *H04N 5/2256* (2013.01); *H04N 13/0239* (2013.01)

(58) Field of Classification Search
None
See application file for complete search history.

(56) References Cited

U.S. PATENT DOCUMENTS

| | | | | |
|---|---|---|---|---|
| 2007/0140549 A1* | 6/2007 | Littlefield | ............. | G06T 1/0007 382/154 |
| 2010/0239135 A1* | 9/2010 | Luisi | ................... | A61B 5/0077 382/128 |
| 2012/0123252 A1* | 5/2012 | Brunner | ................ | A61B 5/061 600/425 |
| 2012/0293667 A1* | 11/2012 | Baba | .................. | H04N 13/0246 348/187 |
| 2013/0300728 A1* | 11/2013 | Reichow | .................. | G09G 3/36 345/419 |
| 2015/0035945 A1* | 2/2015 | Zhang | ................ | H04N 13/0239 348/46 |

\* cited by examiner

*Primary Examiner* — Frederick Bailey
(74) *Attorney, Agent, or Firm* — Donald J Lenkszus

(57) ABSTRACT

Apparatus is provided to capture three-dimensional images of a subject's head. The apparatus comprises a plurality of stereographic digital cameras that are operable simultaneously and are disposed in a predetermined vertical planar relationship to each other. The plurality of stereographic digital cameras are positioned to capture a group of stereographic digital image pairs of a corresponding vertical hemispherical surface portion of the head of the subject when the subject is positioned in a predetermined location in front of the plurality of stereographic digital cameras. The apparatus further comprises a processing apparatus coupled to the plurality of stereographic digital cameras. The processing apparatus operates on the group of stereographic digital image pairs to generate a three-dimensional digital image file of at least a full vertical hemispheric portion of the head of the subject.

32 Claims, 6 Drawing Sheets

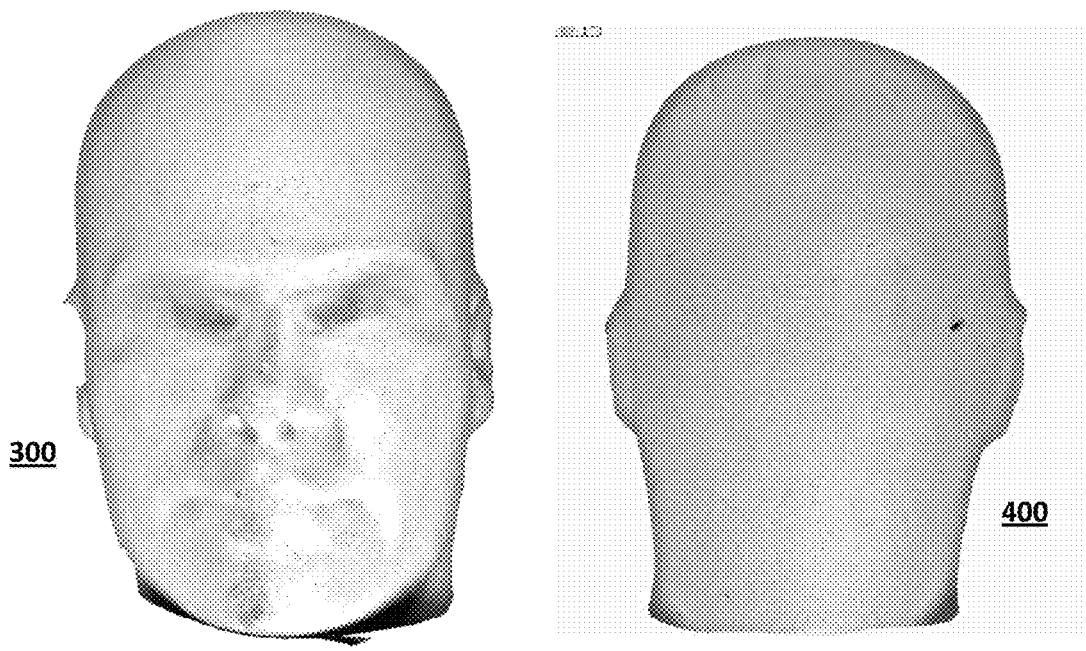
FIG. 3
FIG. 4
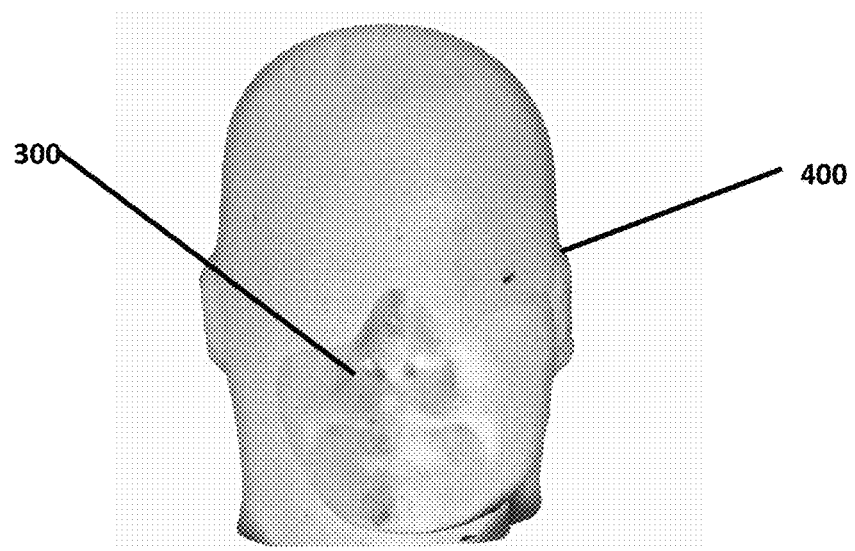
FIG. 5

US 9,743,068 B2

APPARATUS FOR GENERATION OF THREE-DIMENSIONAL DIGITAL DATA REPRESENTATIVE OF HEAD SHAPES

FIELD OF THE INVENTION

This invention pertains to a system and method for generation of three-dimensional digital data representative of three-dimensional head shapes.

BACKGROUND OF THE INVENTION

Cranial remodeling is utilized to correct for deformities in the head shapes of infants. Prior to the development of the Dynamic Orthotic Cranioplasty$^{SM}$ method of cranial remodeling by Cranial Technologies, Inc, the assignee of the present invention, the only viable approach for correction of cranial deformities was surgical correction of the shape of the cranium. Dynamic Orthotic Cranioplasty$^{SM}$ utilizes a treatment protocol in which the DOC BAND® cranial remodeling device is custom produced for each subject to be treated.

In the past, custom cranial remodeling devices were produced by first obtaining a full size and accurate cast of the actual head shape of each subject. This cast was then modified to produce a second or desired head shape model. The second or desired head shape model is used to form the cranial remodeling band for the infant. In the past, the second or desired shaped head shape model was obtained by manually modifying the first cast to form the desired shape model.

Cranial Technologies, Inc. continued its pioneering developments with its proprietary DSI® digital image capturing system and its Digital Surface Imaging® methodology for the time efficient and safe image capture of three-dimensional full head images.

More specifically, the DSI® digital image capturing system was and is utilized to capture digital data representative of digital images of a deformed head of a subject.

The DSI® digital image capturing system has been highly successful and effective. However, that system comprises a number of digital cameras that are carried on a structure such that surrounds the subject patient.

It is desirable to provide a system and method that will produce three-dimensional digital images of the entirety of a head of a subject with a structure that has a smaller footprint than the structure utilized in the DSI® digital image capturing system.

SUMMARY

In accordance with the principles of the invention, an improved system and method are provided for producing digital three-dimensional captured image representations of a subject.

In accordance with the principles of the invention, apparatus is provided to capture three-dimensional images of a subject's head. The apparatus comprises a plurality of stereographic digital cameras, each operable to capture a stereoscopic pair of digital images. The plurality of stereographic digital cameras is operable simultaneously and is disposed in a predetermined vertical planar relationship to each other. Each stereographic digital camera is disposed in a corresponding position such that the plurality of stereographic digital cameras are positioned to capture a group of stereographic digital image pairs of a corresponding vertical hemispherical surface portion of the head of the subject when the subject is positioned in a predetermined location in front of the plurality of stereographic digital cameras. The apparatus further comprises a processing apparatus coupled to the plurality of stereographic digital cameras. The processing apparatus operates on the group of stereographic digital image pairs to generate a three-dimensional digital image file of at least a full vertical hemispheric portion of the head of the subject.

In an embodiment the plurality of stereographic digital cameras is operable to capture a first group of first stereographic digital image pairs of a first corresponding vertical hemispherical surface portion of the subject's head when the subject's head is positioned in the predetermined location and in a first predetermined orientation. The processing apparatus operates on the first group of first stereographic digital image pairs to generate a first three-dimensional image file of at least a first full vertical hemispheric portion of the subject's head.

The plurality of stereographic digital cameras is further operate to capture a second group of second stereographic digital image pairs of a second corresponding vertical hemispherical surface portion of the subject's head when the subject's head is positioned in the predetermined location and in a second predetermined orientation. The processing apparatus operates on the second group of second stereographic digital image pairs to generate a second three-dimensional digital image file of at least a second full vertical hemispheric portion of the subject's head.

The processing apparatus is operable to rotate the second three-dimensional digital image file and is operable to register the first three-dimensional digital image file and the rotated second three-dimensional digital image file and is operable to stitch together the first three-dimensional digital image file and the second three-dimensional digital image file to eliminate redundant and/or bad data and to produce a full head three-dimensional digital image file.

An embodiment comprises a single support structure supporting the plurality of stereographic digital cameras in the predetermined vertical planar relationship to each other.

The support structure supports at least one stereographic digital camera in a position disposed in front of and to the left of the predetermined location, a second stereographic digital cameras is disposed in a position in front of and to the right of the predetermined location, and a third stereographic digital camera is disposed in front of and above the predetermined location.

Embodiments may comprise a plurality of illumination sources disposed on the structure to illuminate the subject concurrent with simultaneous operation of the plurality of stereographic digital cameras.

In an embodiment, a first stereographic digital camera is disposed in front of and to the left of the predetermined location, a second stereographic digital camera is disposed in a position in front of and to the right of the predetermined location, and a third stereographic digital camera is disposed in front of and above the predetermined location.

In various embodiments, a plurality of illumination sources is disposed to illuminate the subject concurrent with the simultaneous operation of the plurality of stereographic digital cameras.

In an embodiment, the first stereographic digital camera and the second stereographic digital camera defining a first horizontal plane, and the third stereographic digital camera is disposed in a second horizontal plane spaced apart from and disposed above the first digital plane.

Various embodiments comprise a subject positioning apparatus disposed at a predetermined position relative to the plurality of stereographic digital cameras such that a subject carried on the subject positioning apparatus is disposed in the predetermined location.

The plurality of stereographic digital cameras is operable to simultaneously capture a first group of first stereographic digital image pairs of a first corresponding hemispherical surface portion of the head of the subject when the subject is positioned at the subject positioning apparatus in the predetermined location and in a first predetermined orientation. The processing apparatus operates on the first group of first stereographic digital image pairs to generate a first three-dimensional image file of at least a first full hemispheric portion of the head of the head.

The plurality of stereographic digital cameras is operable to simultaneously capture a second group of second stereographic digital image pairs of a first corresponding hemispherical surface portion of the head of the subject when the subject is positioned at the subject positioning apparatus in the predetermined location and in a second predetermined orientation. The processing apparatus operates on the second group of stereographic digital image pairs to generate a second three-dimensional image file of at least a second full hemispheric portion of the head.

In an embodiment, the processing apparatus is operable to rotate the second three-dimensional image file; to register the first three-dimensional image file and the rotated second three-dimensional file; and to stitch the first three-dimensional image file and the second three-dimensional image file together to eliminate redundant and/or bad data and to produce a full head three-dimensional image file.

In various embodiments, the subject positioning apparatus comprises a vertically displaceable stool.

One embodiment of apparatus to capture three-dimensional images of a subject's head comprises a plurality of simultaneously operable stereographic digital cameras, each comprising an image splitter such that each the digital camera produces a pair of stereographic digital images. The stereographic digital cameras are disposed in vertical planar predetermined relationship to each other and in predetermined relationship to a vertical hemispherical space. The plurality of stereographic digital cameras are disposed in positions such that each stereographic digital camera captures a pair of stereographic digital images of a corresponding portion of the subject's head disposed within the vertical hemispherical space, the plurality of stereographic digital cameras operable to simultaneously capture a group of the stereographic digital image pairs, each the stereographic digital image pair capturing a substantially different surface portion of the subject's head disposed within the vertical hemispherical space. The plurality of stereographic digital cameras is disposed such that the stereographic digital image pairs capture the totality of the surface of the subject's head within the vertical hemispherical space.

The processing apparatus is operable on the group of stereographic digital image pairs to generate a first three-dimensional image file of at least a full vertical hemispheric portion of the subject's head.

A further embodiment comprises a plurality of stereographic digital cameras, each operable to capture a stereoscopic pair of digital images. The plurality of digital cameras are operable simultaneously. The embodiment further comprises a subject positioning apparatus disposed at a predetermined position relative to the plurality of stereographic digital cameras such that a subject carried on the subject positioning apparatus is disposed in a predetermined location.

The apparatus may further comprise a processing apparatus that operates on the group of stereographic digital image pairs to generate a three-dimensional digital image file of at least a full vertical hemispheric portion of the subject's head.

The processing apparatus may be coupled to the plurality of stereographic digital cameras to automatically receive the group of stereographic digital image pairs.

The processing apparatus operates on a first group of first stereographic image pairs of a first corresponding vertical hemispherical surface portion of the subject's head when the subject's head is positioned in the predetermined location and in a first predetermined orientation to generate a first three-dimensional image file of at least a first full vertical hemispheric portion of the subject's head.

The processing apparatus operates on a second group of second stereographic image pairs of a second corresponding vertical hemispherical surface portion of the subject's head when the subject's head is positioned in the predetermined location in front of the support structure and in a second predetermined orientation to generate a second three-dimensional image file of at least a second full vertical hemispheric portion of the subject's head.

The processing apparatus is operable to rotate the second three-dimensional image file and is operable to register the first three-dimensional image file and the rotated second three-dimensional file and is operable to stitch together the first three-dimensional image file and the second three-dimensional image file to eliminate redundant and/or bad data and to produce a full head three-dimensional image file.

In a further embodiment of the invention, the subject positioning apparatus comprises a vertically adjustable subject support.

An embodiment of a method for capturing three-dimensional global images of a subject's head, comprises the steps of: disposing a plurality of stereographic digital cameras in a predetermined vertical relationship to each other, each stereographic digital camera operable to capture a stereoscopic pair of two-dimensional digital images; disposing each stereographic digital camera to capture a stereographic two-dimensional digital image pair of a corresponding vertical hemispherical surface portion of the head of the subject; positioning the subject in a predetermined location in front of the plurality of stereographic digital cameras; simultaneously operating the group of stereographic digital cameras to simultaneously capture a corresponding first plurality of first stereographic two-dimensional digital image pairs; and processing the first plurality of first stereographic two-dimensional digital image pairs to generate a three-dimensional digital image file of at least a first full vertical hemispheric portion of the head of the subject.

The embodiment may further the steps of positioning the subject such that the subject's head is positioned in the predetermined location and in a first predetermined orientation; and processing the first group of first stereographic digital image pairs to generate a first three-dimensional image file of at least a first full vertical hemispheric portion of the head of the subject.

The method may further include the steps of positioning the subject such that the subject's head is positioned in the predetermined location and in a second predetermined orientation; simultaneously operating the plurality of stereographic digital cameras to capture a second group of second stereographic two-dimensional digital image pairs of a second corresponding vertical hemispherical surface portion of the subject's head; and processing the second group of second stereographic two-dimensional digital image pairs to generate a second three-dimensional digital image file of at least a second full vertical hemispheric portion of the head.

Embodiments of the method may comprise: rotating the second three-dimensional digital image file; registering the first three-dimensional digital image file and the rotated second three-dimensional digital image file; and stitching together the first three-dimensional digital image file and the rotated second three-dimensional digital image file to produce a three-dimensional global image file of the head.

The embodiments of the method may further comprise processing the three-dimensional global image file to eliminate redundant and/or erroneous data and may yet further comprise smoothing the three-dimensional global image file.

The embodiments may also comprise storing the smoothed three-dimensional global image file.

Further embodiments may include the step of concurrently illuminating the subject's head while simultaneously operating the group of stereographic digital cameras.

One embodiment of a method for capturing three-dimensional global images of a subject's head, comprises: disposing three stereographic digital cameras in a predetermined vertical relationship to each other, each stereographic digital camera operable to capture a stereoscopic pair of two-dimensional digital images; disposing two of the stereographic digital cameras in a first horizontal plane; disposing a third of the stereographic digital cameras in a second horizontal plane spaced apart from the first horizontal plane; disposing each stereographic digital camera to capture a stereographic two-dimensional digital image pair of a corresponding vertical hemispherical surface portion of the head of the subject; positioning the subject in a predetermined location in front of the first, second and third stereographic digital cameras; simultaneously operating the three stereographic digital cameras to simultaneously capture a corresponding first plurality of first stereographic two-dimensional digital image pairs; and processing the first plurality of first stereographic two-dimensional digital image pairs to generate a three-dimensional digital image file of at least a first full vertical hemispheric portion of the head of the subject.

BRIEF DESCRIPTION OF THE DRAWING

The invention will be better understood from a reading of the following detailed description taken in conjunction with the drawing figures in which like designations are utilized to identify like elements, and in which:

FIG. 3 is a frontal captured vertical hemispherical image;

FIG. 4 is a rear captured vertical hemispherical image;

FIG. 5 is the rear image of FIG. 4 with the frontal image of FIG. 3 overlaid thereon;

DETAILED DESCRIPTION

U.S. Pat. No. 7,127,101 issued Oct. 24, 2006; U.S. Pat. No. 7,142,701 issued Nov. 28, 2006; U.S. Pat. No. 7,162,075 issued Jan. 9, 2007: U.S. Pat. No. 7,177,461 issued Feb. 13, 2007; U.S. Pat. No. 7,227,979 issued Jun. 5, 2007; U.S. Pat. No. 7,242,798 issued Jul. 10, 2007; U.S. Pat. No. 7,245,743 issued Jul. 17, 2007; U.S. Pat. No. 7,280,682 issued Oct. 9, 2007; U.S. Pat. No. 7,305,369 issued Dec. 4, 2007; U.S. Pat. No. 7,542,950 issued Jun. 2, 2009; U.S. Pat. No. 8,103,088 issued Jan. 24, 2012; U.S. Pat. No. 8,217,993 issued Jul. 10, 2012; U.S. Pat. No. 8,442,288 issued May 14, 2013; U.S. Pat. No. 8,442,308 issued May 14, 2013; U.S. Pat. No. 8,472,681 issued Jun. 25, 2013; and U.S. Pat. No. 8,494,237 issued Jul. 23/2013 are all assigned to the assignee of the present application and the disclosures contained in each of the patents are expressly incorporated herein by reference.

Figure 1:
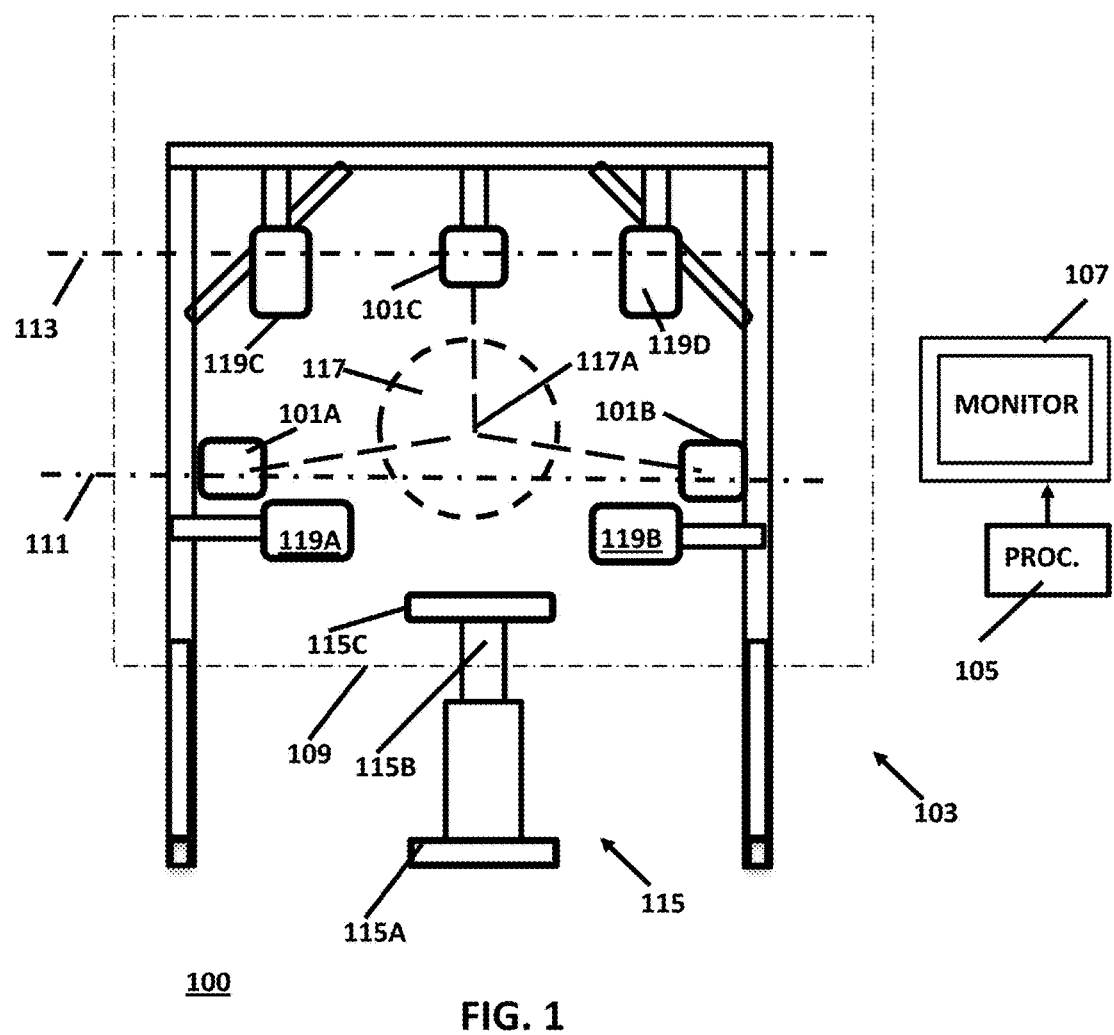
FIG. 1 is a front view of a representative embodiment of the invention.
Figure 2:
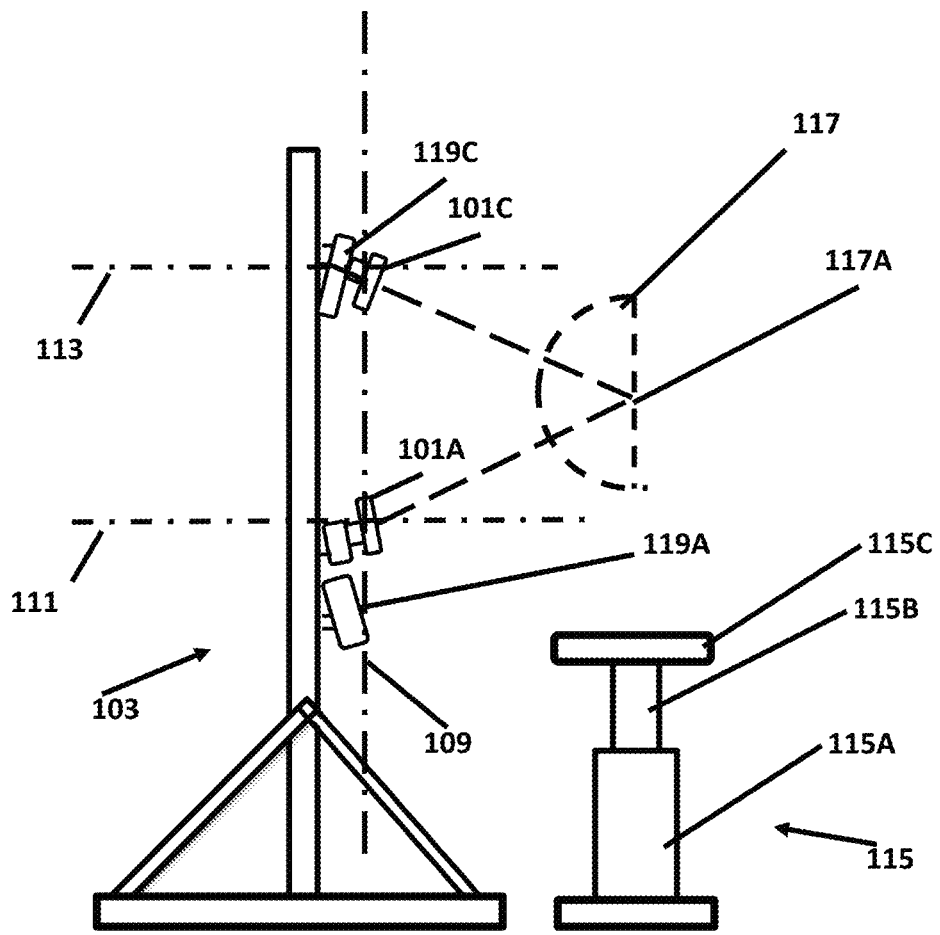
FIG. 2 is a side view of the embodiment of FIG. 1.

FIGS. 1 and 2 illustrate a representative embodiment of a system 100 in accordance with the principles of the invention. System 100 comprises a plurality of three-dimensional digital cameras 101A, 101B, and 101C. As used herein the term three-dimensional digital camera is used to describe a digital camera that is configured to acquire a plurality of two-dimensional views with identical magnification of a scene at different vantage points without relocating the camera to different locations. The three-dimensional digital camera may simultaneously or sequentially at a high rate of speed record each of a plurality of two-dimensional images. Various three-dimensional digital cameras are known in the prior art as are three-dimensional lens attachments to digital cameras that convert the two-dimensional digital camera into a three-dimensional digital camera. In one specific embodiment of the invention conventional single lens reflex (SLR) digital cameras are utilized with removable lens capabilities provided with a 3D lens, referred to by some suppliers as a "stereo lens". In that embodiment, each of the three-dimensional digital cameras captures two two-dimensional images simultaneously.

Each three-dimensional digital camera 101A, 101B, 101C after it captures the plurality of two-dimensional images may either store the resulting digital images onto a memory card or it may transmit the digital images to a processor 105 either via cabling or via a wireless link or via a combination of one or more wireless links and a wired or cable link. Processor 105 is coupled to a display 107 upon which the raw digital images may be displayed.

In certain embodiments, processor 105 and display 107 are located in proximity to three-dimensional digital cameras 101A, 101B, 101C. However, in other embodiments, either processor 105 or processor 105 and display 107 are remotely located from three-dimensional digital cameras 101A, 101B, 101C.

In the embodiment of FIGS. 1 and 2 three-dimensional digital cameras 101A, 101B, 101C are supported by a single support structure 103 that supports three-dimensional digital cameras 101A, 101B, 101C in a predetermined relationship to each other. The particular configuration of support structure 103 shown in FIGS. 1 and 2 is one of many possible configurations that may be utilized.

Three-dimensional digital cameras 101A, 101B, 101C are disposed in a predetermined positional relationship with each other. More specifically the three-dimensional digital cameras are supported in a single vertical plane 109. In addition, three-dimensional digital camera 101A and three-dimensional digital camera 101B are positionally disposed in a first horizontal plane 111 and three-dimensional digital camera 101C is positionally disposed intermediate three-dimensional digital cameras 101A, 101B and vertically displaced above first horizontal plane 111 in a second horizontal plane 113 spaced apart from first horizontal plane 111.

At a predetermined position in front of three-dimensional digital cameras 101A, 101B, 101C a subject positioning device 115 is provided. Subject positioning device 115 as shown in the embodiment comprises a stool type structure that includes a base portion 115A a vertically displaceable portion 115B and a seat portion 115C. A subject is typically seated on the subject positioning device 115. Subject positioning device is vertically adjusted such that the subject's head is in a vertical hemispherical space 117. The position of vertical hemispherical space 117 is determined by the focal axes 119A, 119B, 119C of the three-dimensional digital cameras 101A, 101B, 101C.

Three-dimensional digital cameras 101A, 101B are positioned such that they will be below the center of vertical hemispherical space 117 and are oriented to a point that is located at the approximate center 117A of vertical hemispherical space 117. Three-dimensional digital camera 101C is positioned to be above the center of vertical hemispherical space 117 and is oriented to the center 117A of vertical hemispherical space 117.

A plurality of illumination sources 119A, 119B, 119C, 119D are provided to uniformly illuminate the subject. Illumination sources 119A, 119B, 119C, 119D may be any conventional commercially available illumination sources. In the embodiment of FIGS. 1 and 2 illumination sources 119A, 119B, 119C, 119D are supported by single support structure 103.

In operation, a subject, typically a subject is seated on subject positioning device 115. If the subject is an infant, an adult holds the infant on subject positioning device 115. The subject is positioned such that the subject's head is positioned to be within vertical hemispherical space 117 and the subject's head is in a first orientation with respect to three-dimensional digital cameras 101A, 101B, 101C. In the embodiment, the first orientation is that the subject is facing three-dimensional digital cameras 101A, 101B, 101C.

With the subject in the first orientation, three-dimensional digital cameras 101A, 101B, 101C are simultaneously operated concurrent with operation of illumination sources 119A, 119B, 119C, 119D. Each three-dimensional digital camera 101A, 101B, 101C takes a pair of stereographic two-dimensional digital images of a portion of the subject's head over at that portion of the subject's head disposed within vertical hemispherical space 117. Each three-dimensional digital camera 101A, 101B,101C takes a pair of two-dimensional images of a portion of the subject's head within vertical hemispherical space 117 such that the plurality of stereographic three-dimensional digital image pairs covers at least the entirety of the subject's head disposed within vertical hemispherical space 117. The resulting first plurality of stereographic two-dimensional digital image pairs is transmitted to processor 105.

Processor 105 receives the first plurality of stereographic two-dimensional image pairs and processes each pair utilizing commercially available software to generate a three-dimensional digital image for the corresponding surface portion of the subject's head from the corresponding stereographic two-dimensional digital image pair. The result is an intermediate plurality of three-dimensional digital images. Processor 105 then orients each three-dimensional digital image, stitches the plurality of three-dimensional images together, and removes redundant and extraneous data and performs a smoothing operation to form a vertical hemispherical three-dimensional image of the subject's head in the first orientation. FIG. 3 shows a resulting vertical three-dimensional digital image 300 of the subject's head for a subject oriented to face three-dimensional digital cameras 101A, 101B, 101C.

The subject's orientation relative to three-dimensional digital cameras 101A, 101B, 101C is then changed to a second orientation such that the vertical hemispherical portion of the subject's head that was not facing the three-dimensional digital cameras 101A, 101B, 101C is oriented to face three-dimensional digital cameras 101A, 101B, 101C. In the case described above where the first orientation of the subject's head was facing towards three-dimensional digital cameras 101A, 101B, 101C, the second orientation is with the subject's head facing away from three-dimensional digital cameras 101A, 101B, 101C.

The subject is positioned such that the subject's head is positioned to be within vertical hemispherical space 117 and the subject's head is in the second orientation with respect to three-dimensional digital cameras 101A, 101B, 101C.

With the subject in the second orientation, three-dimensional digital cameras 101A, 101B, 101C are simultaneously operated concurrent with operation of illumination sources 119A, 119B, 119C, 119D. Each three-dimensional digital camera 101A, 101B, 101C takes a pair of stereographic two-dimensional digital images of a portion of the subject's head in the second orientation disposed within vertical hemispherical space 117. Each three-dimensional digital camera 101A, 101B, 101C takes a pair of two-dimensional images of a portion of the subject's head in the second orientation within vertical hemispherical space 117 such that the plurality of stereographic three-dimensional digital image pairs covers at least the entirety of the subject's head in the second orientation disposed within vertical hemispherical space 117. The resulting second plurality of stereographic two-dimensional digital image pairs is transmitted to processor 105.

Processor 105 receives the second plurality of stereographic two-dimensional image pairs and processes each pair utilizing commercially available software to generate a three-dimensional digital image for the corresponding surface portion of the subject's head from the corresponding stereographic two-dimensional digital image pair. The result is an intermediate plurality of three-dimensional digital images. Processor 105 then orients each three-dimensional digital image, stitches the plurality of three-dimensional images together, and removes redundant and extraneous data and performs a smoothing operation to form a second vertical hemispherical three-dimensional image of the subject's head in the second orientation. FIG. 4 shows a resulting second vertical hemispherical three-dimensional digital image 400 of the subject's head for a subject oriented to face away from three-dimensional digital cameras 101A, 101B, 101C.

Figure 6:
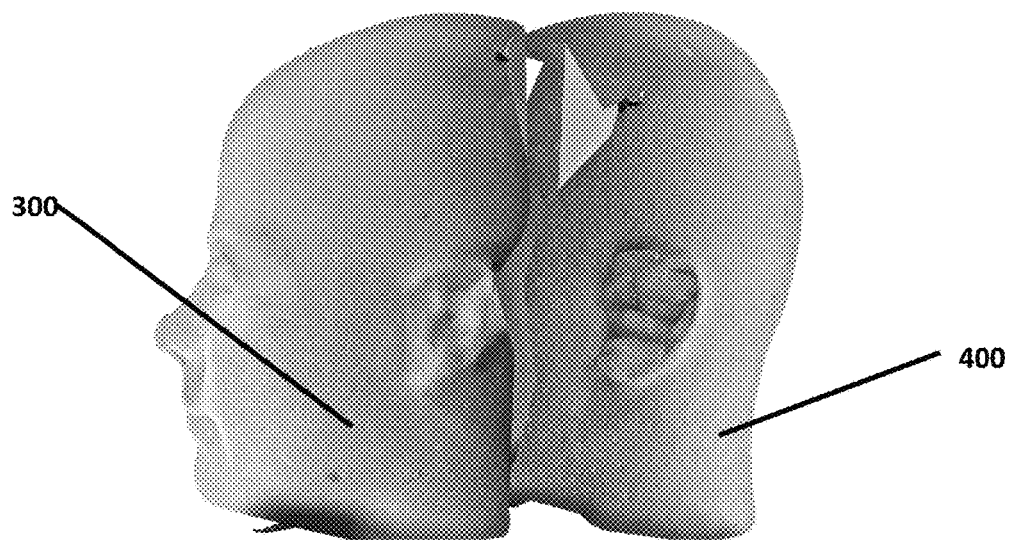
FIG. 6 is the frontal image of FIG. 3 with the rear image of FIG. 4 rotated and aligned thereto.

FIG. 5 shows the first vertical hemispherical digital image 300 of the subject's head of FIG. 3 overlaid onto the second vertical hemispherical digital image 400 of the subject's head of FIG. 4. Processor 105 is utilized to orient the second vertical hemispherical three-dimensional digital image of the subject's head such that both first and second vertical hemispherical three-dimensional digital images 300, 400 of the subject's head are in the same directional orientation as shown in FIG. 6.

Figure 7:
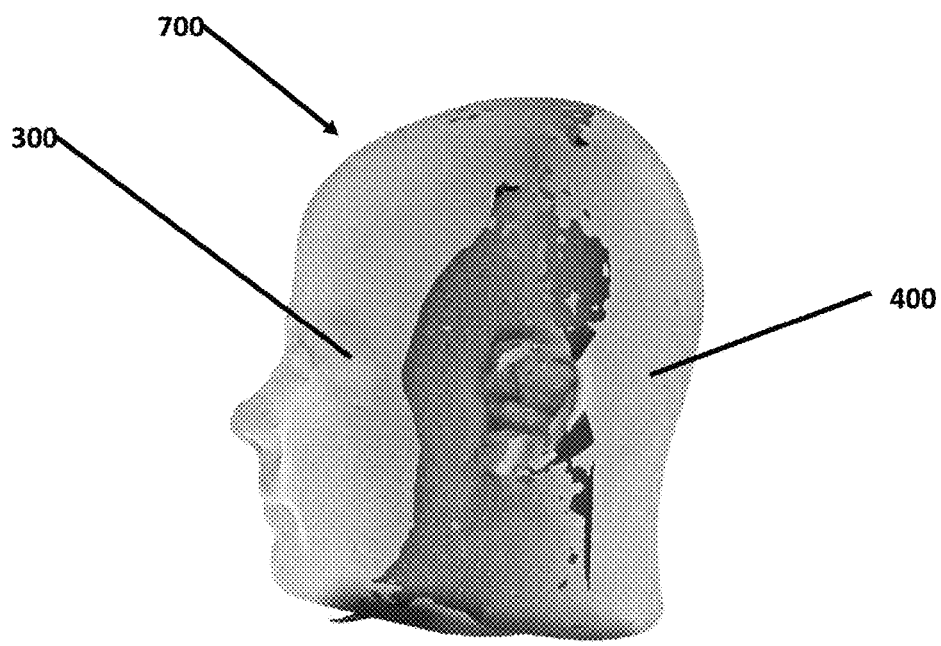
FIG. 7 is the frontal image and rear image of FIG. 6 stitched together.

Processor 105 is then utilized to register and stitch together the first vertical hemispherical three-dimensional digital image of the subject's head and the second vertical hemispherical three-dimensional digital image of the subject's head to produce a three-dimensional global digital image 700 of the subject's head as shown in FIG. 7.

Figure 8:
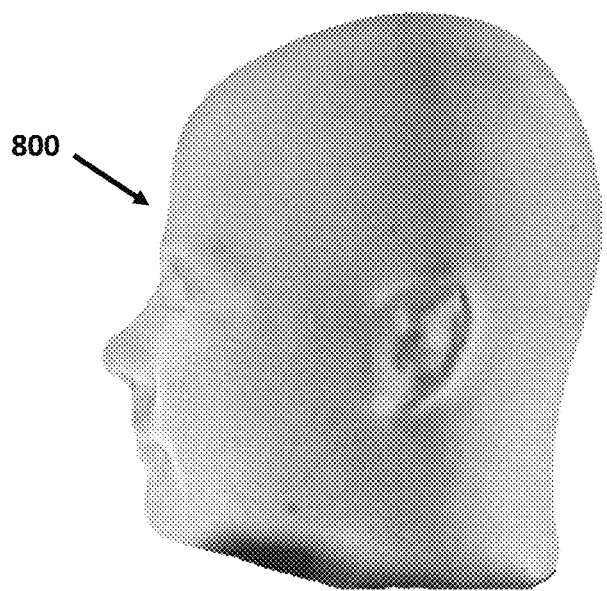
FIG. 8 is the stitched frontal image and rear image of FIG. 6 after smoothing has occurred.
Figure 9:
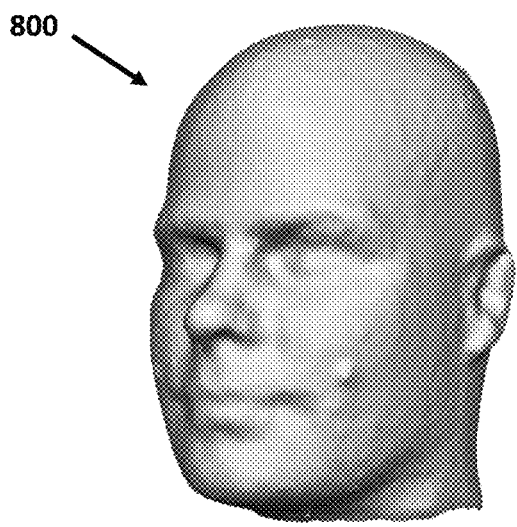
FIG. 9 is another view of the stitched and smoothed frontal image and rear image of FIG. 8.

Processor 105 is utilized to remove redundant and extraneous data and to provide smoothing of the three-dimensional global digital image 700 to produce a three-dimensional global digital image 800 shown in FIGS. 8 and 9. The resultant three-dimensional global digital image 800 may be stored as a digital file in a database, memory, or removable memory, or other recordable medium, or may be transmitted to another system. Three-dimensional global digital image 800 may be utilized for further processing such as to produce a custom cranial remodeling band, custom head appliance, custom helmet, custom head apparel or device or any number of things for use on the head of the subject.

Figure 10:
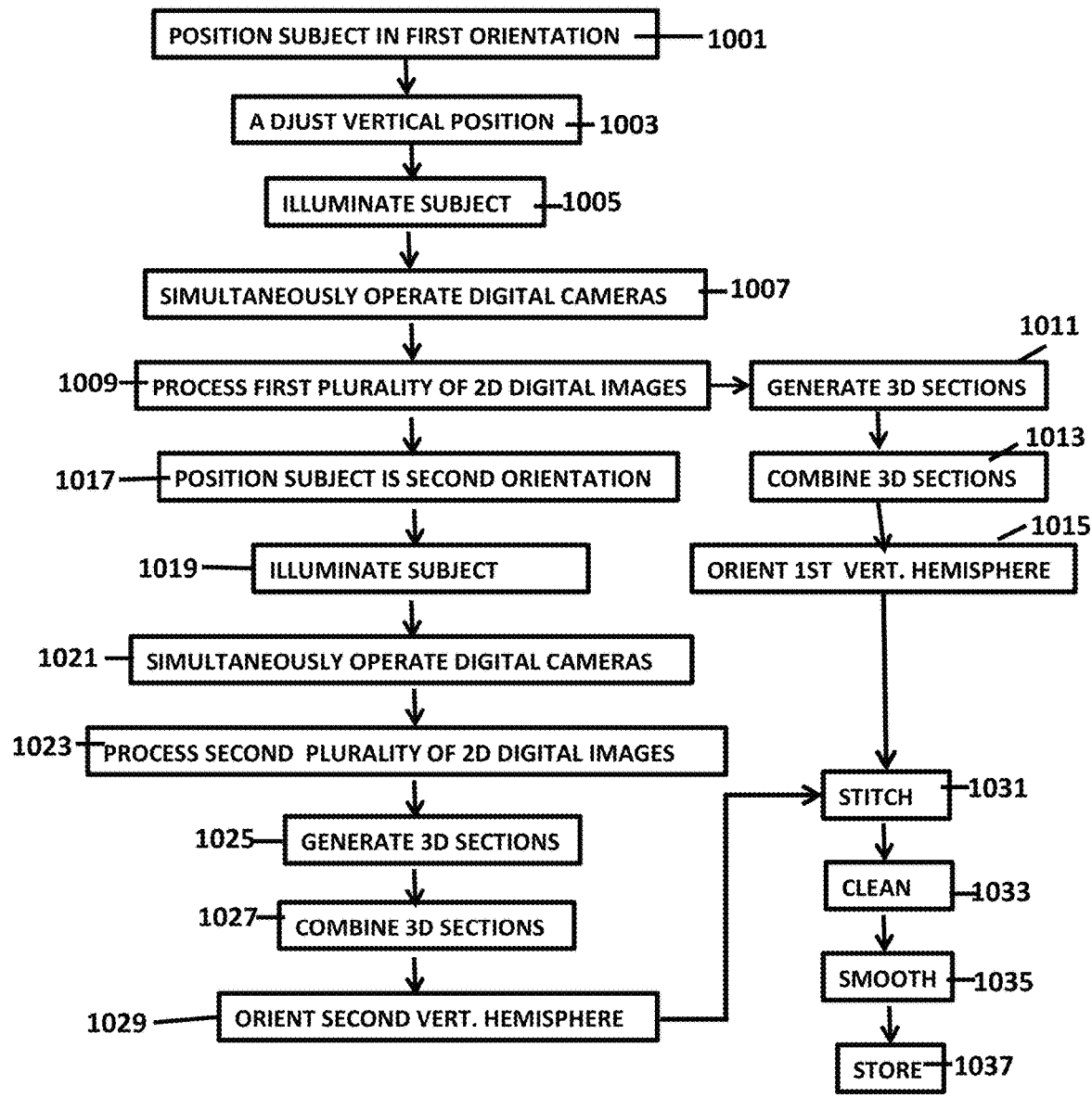
FIG. 10 illustrates method steps.

FIG. 10 illustrates the steps employed in capturing a full global three-dimensional digital image of a subject's head utilizing system 100. At step 1001, the subject is positioned a predetermined distance in front of the plurality of three-dimensional digital cameras 101A, 101B, 101C and is in a first orientation, typically facing three-dimensional digital cameras 101A, 101B, 101C. At step 1003, the subject's position is adjusted vertically such that the subject's head is disposed within vertical hemispherical space 117. A first plurality of two-dimensional images is taken by illuminating the subject at step 1005 while concurrently operating three-dimensional digital cameras 101A, 101B, 101C simultaneously to capture a first plurality of first stereographic two-dimensional digital images at step 1007.

At step 1009 the processing of the first plurality of first stereographic two-dimensional digital images is initiated. At step 1011 each pair of stereographic digital images is processed into a three-dimensional digital image section of the subject's head. At step 1013 the three-dimensional digital image sections are combined to produce a first three-dimensional vertical hemispherical image of the subject's head. The first three-dimensional vertical hemispherical image is oriented to a predetermined orientation at step 1015.

At step 1017 the subject is positioned in a second orientation. A second plurality of two-dimensional images is taken by illuminating the subject at step 1019 while concurrently operating three-dimensional digital cameras 101A, 101B, 101C simultaneously to capture a second plurality of second stereographic two-dimensional digital images at step 1021.

At step 1023 the processing of the first plurality of first stereographic two-dimensional digital images is initiated. At step 1025 each pair of the second plurality of second stereographic digital images is processed into a three-dimensional digital image section of the subject's head. At step 1027 the three-dimensional digital image sections are combined to produce a second three-dimensional vertical hemispherical image of the subject's head. The second three-dimensional vertical hemispherical image is oriented to a predetermined orientation at step 1029.

At step 1031, the first and second three-dimensional vertical hemispherical images of the subject's head are stitched together to produce a three-dimensional digital global image of the subject's head. At step 1033, the stitched together three-dimensional global digital image is cleaned by removing extraneous and overlapping data. At step 1035, the stitched together three-dimensional global digital image is smoothed and the resulting three-dimensional global digital image is stored as a data file at step 1037.

The invention has been described in terms of illustrative embodiments. It will be apparent to those skilled in the art that various changes and modifications can be made to the illustrative embodiments without departing from the spirit or scope of the invention. It is intended that the invention include all such changes and modifications. It is also intended that the invention not be limited to the illustrative embodiments shown and described. It is intended that the invention be limited only by the claims appended hereto.

The invention claimed is:

1. Apparatus to capture three-dimensional images of a subject's head, said apparatus comprising:
    a plurality of stereographic digital cameras, each stereographic digital camera operable to capture a stereoscopic pair of digital images, said plurality of stereographic digital cameras are operable simultaneously;
    all of said plurality of stereographic digital cameras being disposed within a single vertical plane in a predetermined vertical planar relationship to each other;
    each stereographic digital camera of said plurality of digital cameras disposed in a corresponding position in said single vertical plane such that said plurality of stereographic digital cameras are positioned to capture a group of stereographic digital image pairs of a corresponding vertical hemispherical surface portion of said head of said subject when said subject is positioned in a predetermined location in front of said plurality of stereographic digital cameras; and
    a processing apparatus coupled to said plurality of stereographic digital cameras, said processing apparatus operates on a first said group of stereographic digital image pairs to generate a first three dimensional digital image file of at least a first full vertical hemispheric portion of said head of said subject, said processing apparatus operates on a second said group of stereographic digital image pairs to generate a second three dimensional digital image file of at least a second full vertical hemispheric portion of said head of said subject, said processing apparatus utilizes only said first three dimensional digital image file and said second three dimensional digital image file to produce a three dimensional digital image file of the entire said head of said subject.

2. Apparatus in accordance with claim 1, wherein:
    said plurality of stereographic digital cameras is operable to capture said first group of first stereographic digital image pairs of a first corresponding vertical hemispherical surface portion of said subject's head when said subject's head is positioned in said predetermined location and in a first predetermined orientation;
    said processing apparatus operates on said first group of first stereographic digital image pairs to generate said first three dimensional image file of at least said first full vertical hemispheric portion of said subject's head.

3. Apparatus in accordance with claim 2, wherein:
    said plurality of stereographic digital cameras is further operable to capture said second group of second stereographic digital image pairs of a second corresponding vertical hemispherical surface portion of said subject's head when said subject's head is positioned in said predetermined location and in a second predetermined orientation;
    said processing apparatus operates on said second group of second stereographic digital image pairs to generate said second three dimensional digital image file of at least said second full vertical hemispheric portion of said subject's head.

4. Apparatus in accordance with claim 3, wherein:
    said processing apparatus is operable to rotate said second three dimensional digital image file and is operable to register said first three dimensional digital image file and said rotated second three dimensional digital image file and is operable to stitch together said first three dimensional digital image file and said second three dimensional digital image file to eliminate redundant and/or bad data and to produce said three dimensional digital image file of said entire head.

5. Apparatus in accordance with claim 4, comprising:
a single support structure supporting said plurality of stereographic digital cameras in said predetermined vertical planar relationship to each other.

6. Apparatus in accordance with claim 5, comprising:
said support structure supports at least one said stereographic digital camera in a position disposed in front of and to the left of said predetermined location, a second said stereographic digital cameras is disposed in a position in front of and to the right of said predetermined location, and a third said stereographic digital camera is disposed in front of and above said predetermined location.

7. Apparatus in accordance with claim 6, comprising:
a plurality of illumination sources disposed on said structure to illuminate said subject concurrent with simultaneous operation of said plurality of stereographic digital cameras.

8. Apparatus in accordance with claim 1, comprising:
a plurality of illumination sources disposed on said structure to illuminate said subject concurrent with simultaneous operation of said plurality of stereographic digital cameras.

9. Apparatus in accordance with claim 1, comprising:
a first stereographic digital camera of said plurality of stereographic digital cameras is disposed in a position in front of and to the left of said predetermined location, a second stereographic digital camera of said plurality of stereographic digital cameras is disposed in a position in front of and to the right of said predetermined location, and a third stereographic digital camera of said plurality of stereographic digital cameras is disposed in front of and above said predetermined location.

10. Apparatus in accordance with claim 9, comprising:
a plurality of illumination sources disposed to illuminate said subject concurrent with said simultaneous operation of said plurality of stereographic digital cameras.

11. Apparatus in accordance with claim 9, wherein:
said first stereographic digital camera and said second stereographic digital camera define a first horizontal plane, and said third stereographic digital camera is disposed in a second horizontal plane spaced apart from and disposed above said first digital plane.

12. Apparatus in accordance with claim 1, comprising:
a subject positioning apparatus disposed at a predetermined position relative to said plurality of stereographic digital cameras such that a subject carried on said subject positioning apparatus is disposed in said predetermined location.

13. Apparatus in accordance with claim 12, wherein:
said plurality of stereographic digital cameras is operable to simultaneously capture said first group of first stereographic digital image pairs of said first full hemispherical surface portion of said head of said subject when said subject is positioned at said subject positioning apparatus in said predetermined location and in a first predetermined orientation;
said processing apparatus operates on said first group of first stereographic digital image pairs to generate a first three dimensional image file of at least said first full hemispheric portion of said head of said head.

14. Apparatus in accordance with claim 13, wherein:
said plurality of stereographic digital cameras is operable to simultaneously capture a second group of second stereographic digital image pairs of said second hemispherical surface portion of said head of said subject when said subject is positioned at said subject positioning apparatus in said predetermined location and in a second predetermined orientation;
said processing apparatus operates on said second group of stereographic digital image pairs to generate said second three dimensional image file of at least said second full hemispheric portion of said head.

15. Apparatus in accordance with claim 14, wherein:
said processing apparatus is operable to rotate said second three dimensional image file;
said processing apparatus is operable to register said first three dimensional image file and said rotated second three dimensional file; and
said processing apparatus is operable to stitch said first three dimensional image file and said second three dimensional image file together to eliminate redundant and/or bad data and to produce a full head three dimensional image file.

16. Apparatus in accordance with claim 12, comprising:
a single support structure supporting said plurality of stereographic digital cameras in said predetermined vertical planar relationship to each other.

17. Apparatus in accordance with claim 16, wherein:
said support structure supports at least one said stereographic digital camera of said plurality of stereographic digital cameras in a position disposed in front of and to the left of said subject positioning apparatus, a second said stereographic digital cameras of said plurality of stereographic digital cameras is disposed in a position in front of and to the right of said subject positioning apparatus and a third said stereographic digital camera of said plurality of stereographic digital cameras is disposed in front of and above said subject positioning apparatus.

18. Apparatus in accordance with claim 12, wherein:
said predetermined vertical planar relationship comprises a first stereographic digital camera of said plurality of stereographic digital cameras disposed in front of said subject positioning apparatus and on the right side of said structure, a second stereographic digital camera of said plurality of stereographic digital cameras disposed in front of said subject positioning apparatus and on the left side of said structure, and a third stereographic digital camera of said plurality of stereographic digital cameras disposed in front of said subject positioning apparatus and above and intermediate said first stereographic digital camera and said second stereographic digital camera.

19. Apparatus in accordance with claim 12, wherein:
said predetermined vertical planar relationship comprises a first stereographic digital camera of said plurality of stereographic digital cameras disposed on the right side of said structure, a second stereographic digital camera of said plurality of stereographic digital cameras disposed on the left side of said structure, said first stereographic digital camera and said second stereographic digital camera defining a first horizontal plane, and a third stereographic digital camera disposed in a second horizontal plane spaced apart from and disposed above said first digital plane.

20. Apparatus in accordance with claim 12, wherein:
said subject positioning apparatus comprises a vertically displaceable stool.

21. Apparatus to capture three-dimensional images of a subject's head, said apparatus comprising:
a plurality of simultaneously operable stereographic digital cameras, each comprising an image splitter such that each said digital camera produces a pair of stereographic digital images;
all of said plurality of stereographic digital cameras disposed in vertical planar predetermined relationship to each other and in predetermined relationship to a vertical hemispherical space;
all of said plurality of stereographic digital cameras are disposed in positions in said vertical plane such that each said stereographic digital camera captures a pair of stereographic digital images of a corresponding portion of said subject's head disposed within said vertical hemispherical space, said plurality of stereographic digital cameras operable to simultaneously capture a group of said stereographic digital image pairs, each said stereographic digital image pair capturing a substantially different surface portion of said subject's head disposed within said vertical hemispherical space; and
all of said plurality of stereographic digital cameras are disposed in said vertical plane such that said stereographic digital image pairs capture the totality of the surface of said subject's head within said vertical hemispherical space such that when said subject's head is disposed in said vertical hemispherical space in a first orientation, the entirety of the surface portions of a first half of said subject's head are captured and when said subject's head is disposed in said vertical hemispherical space in a second orientation the entirety of the surface portions of the other half of said subject's head are captured.

22. Apparatus in accordance with claim 21, comprising:
processing apparatus operable on each said group of stereographic digital image pairs to generate three dimensional image files of at least a full vertical hemispheric portion of said subject's head.

23. Apparatus in accordance with claim 22, wherein:
said plurality of stereographic digital cameras is utilized to capture a first group of first stereographic image pairs of a first corresponding vertical hemispherical surface portion of said subject's head when said subject's head is positioned in said predetermined location and in said first predetermined orientation; and
said processing apparatus operates on said first group of first stereographic digital image pairs to generate a first three dimensional image file of at least said first half full vertical hemispheric portion of said subject's head.

24. Apparatus in accordance with claim 23, wherein:
said plurality of stereographic digital cameras are utilized to capture a second group of second stereographic image pairs of a second corresponding vertical hemispherical surface portion corresponding to the other half full vertical hemispheric portion of said subject's head when said subject's head is positioned in said predetermined location in front of said support structure and in said second predetermined orientation; and
said processing apparatus operates on said second group of said second stereographic image pairs to generate a second three dimensional image file of at least said other half full vertical hemispheric portion of said subject's head.

25. Apparatus in accordance with claim 24, wherein:
said processing apparatus is operable to rotate said second three dimensional image file and is operable to register said first three dimensional image file and said rotated second three dimensional file and is operable to stitch together said first three dimensional image file and said second three dimensional image file to eliminate redundant and/or bad data and to produce a full head three dimensional image file.

26. Apparatus to capture three-dimensional images of a head of a subject, said apparatus comprising:
a plurality of stereographic digital cameras, each stereographic digital camera operable to capture a stereoscopic pair of digital images, said plurality of digital cameras are operable simultaneously;
a subject positioning apparatus disposed at a predetermined position relative to said plurality of stereographic digital cameras such that a subject carried on said subject positioning apparatus is disposed in a predetermined location and is operable to place as subject in a first predetermined orientation facing said plurality of stereographic digital cameras and operable to place said subject in a second predetermined orientation facing away from said plurality of stereographic digital cameras;
all of said plurality of stereographic digital cameras are disposed in a predetermined vertical planar relationship to each other defining a single vertical plane; and
each stereographic digital camera of said plurality of stereographic digital cameras disposed in a corresponding position in said single vertical plane such that said plurality of stereographic digital cameras are positioned to capture groups of stereographic digital image pairs of a corresponding vertical hemispherical surface portion of said head of said subject when said subject is positioned in said predetermined position such that when said head is disposed in said first orientation, the entirety of the surface portions of a first half of said head are captured and when said head is disposed in said second orientation the entirety of the surface portions of the other half of said head are captured.

27. Apparatus in. accordance with claim 26, comprising:
a processing apparatus, said processing apparatus operates on each said group of stereographic digital image pairs to generate a three dimensional digital image file of at least a full vertical hemispheric portion of the corresponding one of said first half or the other half of said head.

28. Apparatus in accordance with claim 27, wherein:
said processing apparatus is coupled to said plurality of stereographic digital cameras to automatically receive each said group of stereographic digital image pairs.

29. Apparatus in accordance with claim 28, wherein:
said processing apparatus operates on a first group of first stereographic image pairs of a first corresponding vertical hemispherical surface portion of said subject's head when said subject's head is positioned in said predetermined location and in said first predetermined orientation to generate a first three dimensional image file of at least said first half of said head.

30. Apparatus in accordance with claim 29, wherein:
said processing apparatus operates on a second group of second stereographic image pairs of a second corresponding vertical hemispherical surface portion of said subject's head when said subject's head is positioned in said predetermined location in front of said support structure and in said second predetermined orientation to generate a second three dimensional image file of at least said other half of said head.

31. Apparatus in accordance with claim 30, wherein:
said processing apparatus is operable to rotate said second three dimensional image file and is operable to register said first three dimensional image file and said rotated second three dimensional file and is operable to stitch together said first three dimensional image file and said second three dimensional image file to eliminate redundant and/or bad data and to produce a full head three dimensional image file.

32. Apparatus in accordance with claim 26, wherein:
said subject positioning apparatus comprises a vertically adjustable subject support.

* * * * *